United States Patent [19]

Setani et al.

[11] Patent Number: 4,719,488
[45] Date of Patent: Jan. 12, 1988

[54] IMAGING OPTICAL SYSTEM USING DISTRIBUTED INDEX OPTICAL ELEMENTS

[75] Inventors: Michitaka Setani, Kawasaki; Mitsuhiro Tokuhara, Chigasaki; Hiroaki Tsuchiya; Haruhisa Honda, both of Yokohama, all of Japan

[73] Assignee: Canon Kabushiki Kaisha, Tokyo, Japan

[21] Appl. No.: 743,486

[22] Filed: Jun. 11, 1985

[30] Foreign Application Priority Data

Jun. 22, 1984 [JP] Japan ................... 59-129669

[51] Int. Cl.$^4$ ............................. G03B 27/00
[52] U.S. Cl. ............................. 355/1; 355/46
[58] Field of Search ........................ 355/1, 46

[56] References Cited

U.S. PATENT DOCUMENTS 4,349,248 9/1982 Rees ................... 355/1
4,373,780 2/1983 Lama ................... 355/1

FOREIGN PATENT DOCUMENTS

UM9230 3/1984 Japan.

OTHER PUBLICATIONS

*Optics*, vol. 10, No. 2, p. 111, Apr. 1981, "Application of Gradient Index Fiber Array to Copying Machine".

*Primary Examiner*—Monroe H. Hayes
*Attorney, Agent, or Firm*—Fitzpatrick, Cella, Harper & Scinto

[57] ABSTRACT

In an imaging optical system, the angular aperture of distributed index optical elements which are optical elements forming the imaging optical system is 9° or greater and the degree of superposition M of images on a light-receiving surface is $M=2.75+0.5x$. The degree of superposition M of images is represented by $M=X_0/D$, where D is the effective diameter of the optical elements and $X_0$ is the field radius thereof. Also, x is 0 or a greater integer.

2 Claims, 5 Drawing Figures

IMAGING OPTICAL SYSTEM USING DISTRIBUTED INDEX OPTICAL ELEMENTS

BACKGROUND OF THE INVENTION

1. Field of the Invention

This invention relates to an imaging optical system using distributed index optical elements, and in particular to an imaging optical system suitable for use as the optical system of a business machine such as a copying apparatus or a facsimile apparatus.

2. Description of the Prior Art

In the optical system of a business machine such as a copying apparatus or a facsimile apparatus, a double-eye optical system of erect one-to-one magnification such as Selfoc (trade name of a product of Japan Plate Glass Co., Ltd.) has heretofore been used as the imaging optical system instead of a single spherical lens system, whereby compactness of the apparatus has been achieved. Where such distributed index optical elements, i.e., so-called radial distributed index optical elements having an index distribution symmetrical about the optic axis in the radial direction, are arranged in an array-like form, two rows of distributed index optical element arrays are juxtaposed proximately to each other in staggered relationship as shown in Japanese Utility Model Publication No. 9230/1984 in order to eliminate the irregularity of light amount on the image plane. However, the use of plural rows of arrays leads to an increased number of optical elements and therefore to the expensiveness of the apparatus, and further requires the accuracy of arrangement to be very high, and this in turn leads to the difficulties in manufacturing.

For this reason, it has heretofore been desired to arrange a plurality of distributed index optical elements in a row to thereby prepare an imaging optical system of erect one-to-one magnification, and a report of studies on the irregularity of light amount when such an imaging optical system is used is made in *Optics*, Vol. 10, No. 2, p. 111, April 1981. However, the imaging optical systems of a construction in which distributed index optical elements are arranged in a row as heretofore disclosed, including the above-mentioned report, have been no better than mere studies and have been far from being put into practical use. This is because, when, for example, such an imaging optical system is to be put into practical use, forming the optical elements in a row gives rise to the problem of insufficiency of light amount in addition to the irregularity of light amount.

SUMMARY OF THE INVENTION

It is an object of the present invention to provide a distributed index optical element which eliminates any irregularity of light amount and enables a sufficient light amount to be obtained on the image plane.

It is a further object of the present invention to provide an imaging optical system which suffers little from the occurrence of aberrations and is easy to manufacture.

In the imaging optical system according to the present invention, the angular aperture of distributed index optical elements which are optical elements forming the imaging optical system is 9° or greater and the degree of superposition M of images on a light-receiving surface is $M=2.75+0.5x$, thereby achieving the above objects. The degree of superposition M of images is represented by $M=X_0/D$, where D is the effective diameter of said optical elements and $X_0$ is the field radius thereof. Also, x is 0 or a greater integer.

DESCRIPTION OF THE PREFERRED EMBODIMENT

Figure 1:
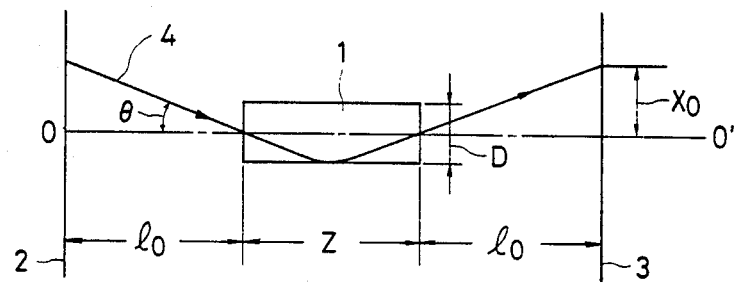
FIG. 1 illustrates a distributed index optical element used in the imaging optical system of the present invention.

FIG. 1 illustrates a distributed index optical element. In FIG. 1, reference numeral 1 designates a distributed index optical element having an index distribution in a direction perpendicular to the optical axis 00' with the optical axis as the center. Reference numeral 2 denotes an object surface and reference numeral 3 designates an imaging plane disposed at an optically conjugate position with respect to the optical element 1 and in a one-to-one magnification imaging relationship. Z is the length of the optical element 1 in the direction of the optical axis, D is the effective diameter of the optical element 1, and $l_0$ is the spacing between the optical element 1 and the object surface 2 or between the optical element 1 and the imaging plane 3. A light ray 4 shows an incident light ray of maximum angle of view $\theta$ from the object surface imaged on the imaging plane 3 by the optical element 1, and the height from the optical axis at which this light ray intersects the imaging plane 3, i.e., the field radius, is represented by $X_0$. Said angle $\theta$ is called the angular aperture of the optical element.

Figure 2:
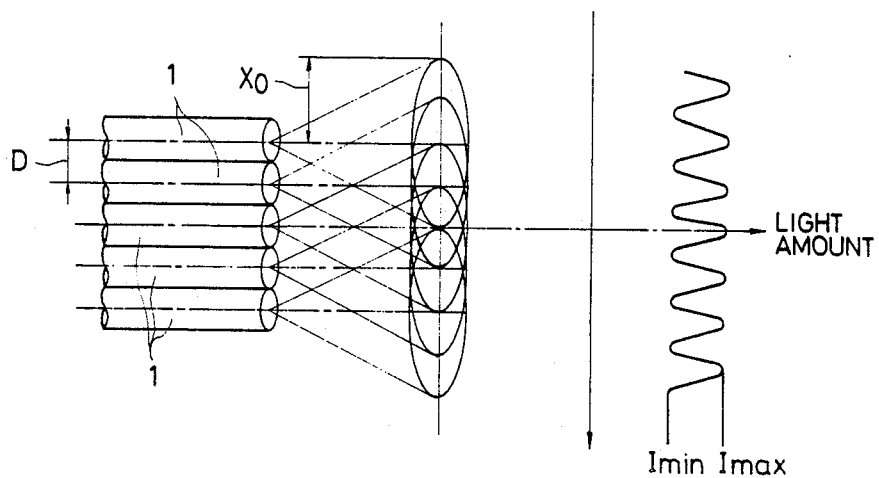
FIG. 2 shows the irregularity of intensity of illumination of an image obtained by a double-eye imaging optical system formed by distributed index optical elements arranged in a row.

FIG. 2 shows the state of the distribution of light intensity or amount, on the imaging plane when the optical elements 1 are arranged in a row. As shown in FIG. 2, the light beams from the respective optical elements 1 are imaged on the imaging plane while being superposed one upon another, and this degree of superposition M is represented by $$M=X_0/D.$$

Also, irregularity of the light amount occurs due to a number of light beams being imaged while being superposed one upon another, and when the light amount in the lightest portion is I max and the light amount in the darkest portion is I min, the irregularity of light amount $\Delta I$ is expressed as $$\Delta I = \frac{I\max - I\min}{I\max}$$

Figure 3:
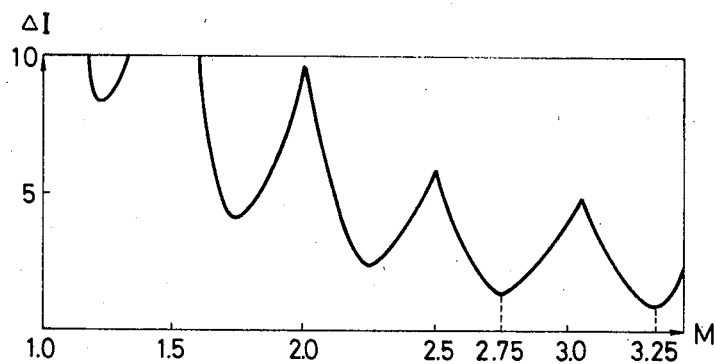
FIG. 3 shows the relation between the degree of superposition M and the irregularity of intensity of illumination $\Delta I$ in the double-eye imaging optical system formed by distributed index optical elements arranged in a row.
Figure 4:
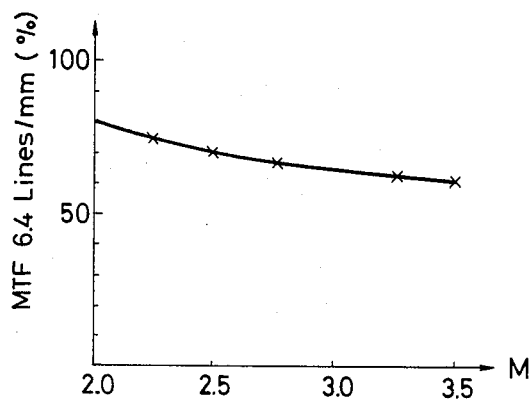
FIG. 4 shows the relation between the degree of superposition M and M.T.F. in the double-eye imaging optical system formed by distributed index optical elements arranged in a row.

The relation between the irregularity of light amount $\Delta I$ and the degree of superposition M of images when such distributed index optical elements are arranged in a row is known, and this relation is shown in FIG. 3. In FIG. 3, the ordinate represents the irregularity of light amount $\Delta I$ and the abscissa represents the degree of superposition M. As is apparent from FIG. 3, the irregularity of light amount can be made sufficiently small by selecting the degree of superposition M in the vicinity of M=2.75+0.5x, where x is 0 or a greater integer. However, preferably, the degree of superposition may be in the vicinity M=2.75 or 3.25. This means that even if M assumes a greater value, the irregularity of light amount $\Delta I$ does not become so small, and if M becomes greater, the value of said angle of incidence $\theta$ becomes greater and accordingly, to effect imaging by optical elements of the same length Z and the same effective diameter D, it is necessary to sharply bend the incident light beam and accordingly, aberrations become liable to occur. Further, the optical elements must be endowed with an index distribution of steep gradient, and this is difficult to achieve in manufacturing. Furthermore, if M becomes greater, the resolving power is more or less reduced and therefore, a value in the vicinity of M=2.75 or 3.25 is desirable. The relation between the degree of superposition M and the resolving power is shown in FIG. 4. FIG. 4 shows the value of M.T.F. in the case of a wavelength of 580 nm and an angular aperture of 11°, the ordinate representing M.T.F. and the abscissa representing the degree of superposition M. As is apparent from FIG. 4, M.T.F. gradually decreases as the degree of superposition M increases.

The angular aperture $\theta$ will now be described. Usually, when an imaging optical system of this kind is used in a business machine, especially a copying machine, the F-value referred to in popular lens systems must be 5 at lowest. The condition of the angular aperture $\theta$ can be found from the following equations which represent the brightness of a light transmitting element of this kind equivalently to the aforementioned F-value:

$$F = \left[ \frac{3 \cdot M \cdot \sin K}{4 \cdot \pi \cdot \theta^2} \right]^{\frac{1}{2}}$$

$$K = \cos^{-1}\left( -\frac{1}{2M} \right)$$

From these equations, it is necessary that in the above-mentioned degree of superposition M, the angular aperture $\theta$ be at least 9°. When the degree of superposition M is calculated as M=2.75 and F=4.5, the angular aperture $\theta$ is 10.2° and when the degree of superposition M is calculated as M=3.25 and F=4.5, the angular aperture $\theta$ is 11.1°. Also, if the angular aperture $\theta$ is too great, the depth of field will become shallow and even a slight deviation will cause the image on the image plane to be blurred.

Accordingly, it is preferable that with the above-mentioned degree of superposition M taken into account, the value of the angular aperture $\theta$ be set between $9° \leq \theta \leq 13°$.

In the present embodiment, as described above, by the degree of superposition M and the angular aperture being set to appropriate values, a good imaging characteristic is obtained even in an imaging optical system wherein index distribution type optical elements are arranged in a row, and to keep this degree of superposition M at a predetermined value, from the relation represented by the following equation $$M = X_0/D = -\frac{1}{2} \sec\left( \frac{\sqrt{A}}{2} Z \right),$$

the fluctuation (irregularity) of the index distribution constant A of the optical elements is regulated by the length Z of the elements, whereby M can be kept at a predetermined value. By utilizing the length Z of the elements to keep the degree of superposition M at the predetermined value, regulation different from the conventional regulation method is required in the field of the copying apparatus. That is, in the conventional copying apparatus using an index distribution type lens array, as the regulation method for keeping the surface of an original and a photosensitive medium in an optically conjugate relationship, regulation has been accomplished by varying the length Z of the optical elements without varying the already set distance between the surface of the original and the photosensitive medium. Accordingly, in such a regulation method, it is impossible to keep the degree of superposition M constant. In the present invention, the length Z of the optical elements is utilized only to keep the degree of superposition M at a predetermined value as described above, and the regulation for keeping the object and the image optically conjugate is accomplished by mechanically regulating the length of the optical path. By such regulation, any reduction in resolution will pose no problem.

Figure 5:
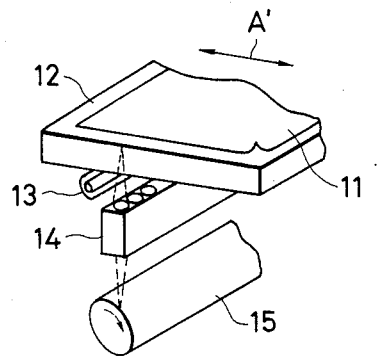
FIG. 5 is a schematic perspective view showing an embodiment of the copying apparatus using the imaging optical system according to the present invention.

FIG. 5 is a schematic perspective view showing an example in which the imaging optical system according to the present invention is applied to a copying apparatus. In FIG. 5, reference numeral 11 designates an original to be copied, and reference numeral 12 denotes an original carriage supporting the original thereon and movable in the directions of bilateral arrow A. Reference numeral 13 designates illuminating means formed by a bar-like light source and a reflector. The illuminating means 13 illuminates the surface of the original in a slit-like form. Reference numeral 14 denotes the erect one-to-one magnification imaging optical system, and reference numeral 15 designates a photosensitive drum. The imaging optical system 14 forms on the surface of the photosensitive drum 15 the erect one-to-one magnification image of the original 11 illuminated in a slit-like form by the illuminating means 13. The rotation of the photosensitive drum 15 and the movement of the original carriage 12 are effected in synchronism with each other and the image of the original 11 is formed on the surface of the photosensitive drum 15. The image formed on the surface of the photosensitive drum is visualized by a well-known process (not shown).

In the imaging optical system according to the present invention, a good image can be obtained by index distribution type optical elements arranged only in a row, and the arrangement in only one row suffices, and this leads to the possibility of providing an apparatus in which the degree of requirement for the manufacturing accuracy is reduced and which is inexpensive.

What is claimed is:

1. A copying apparatus comprising:
    a carriage for supporting an original thereon;
    illuminating means for illuminating the original; and
    an imaging optical system for forming the image of the original on a photosensitive drum, said optical system being formed by a plurality of distributed index optical elements of erect one-to-one magnification arranged in a row, the angular aperture $\theta$ of said optical elements being $9° \leq \theta \leq 13°$, and wherein when the effective diameter of each of said optical elements is D and the field radius thereof is $X_0$ and the degree of superposition M of the images of the original formed on a light-receiving surface by said optical elements is defined as $X_0/D$, said M has a value of approximately $M = 2.75 + 0.5x$, where x is 0 or a greater integer.

2. An imaging optical system according to claim 1, wherein the value of said M is in the vicinity of 2.75 or 3.25.

* * * * *